Jan. 16, 1951          S. LAFLEUR          2,538,108
PRESSURE REDUCING VALVE
Filed June 12, 1944

INVENTOR.
SINAI LAFLEUR
BY
Thos. L. Donnelly
his attorney

Patented Jan. 16, 1951

2,538,108

UNITED STATES PATENT OFFICE 2,538,108

PRESSURE REDUCING VALVE

Sinai Lafleur, Detroit, Mich.

Application June 12, 1944, Serial No. 539,890

1 Claim. (Cl. 50—35)

My invention relates to a new and useful improvement in a pressure reducing valve for interposing in a fluid line through which fluid is delivered under pressure. The valve has an inlet and an outlet end and is adapted for reducing the pressure of the incoming fluid to a predetermined degree so that the fluid passes through the outlet end at a reduced pressure.

It is an object of this invention to provide a pressure reducing valve of this kind which will be simple in structure, economical of manufacture, durable, compact, possessed of a minimum movement of parts, light and highly efficient in use.

Another object of the invention is the provision of a pressure reducing valve of this type in which the reducing is accomplished by the action of a single slidable piston.

Other objects will appear hereinafter.

It is recognized that various modifications and changes may be made in the detail of structure illustrated without departing from the invention itself and it is intended that such variations and changes shall be encompassed by the claim which forms a part hereof.

Forming a part of this application are drawings in which.

Figure 1:
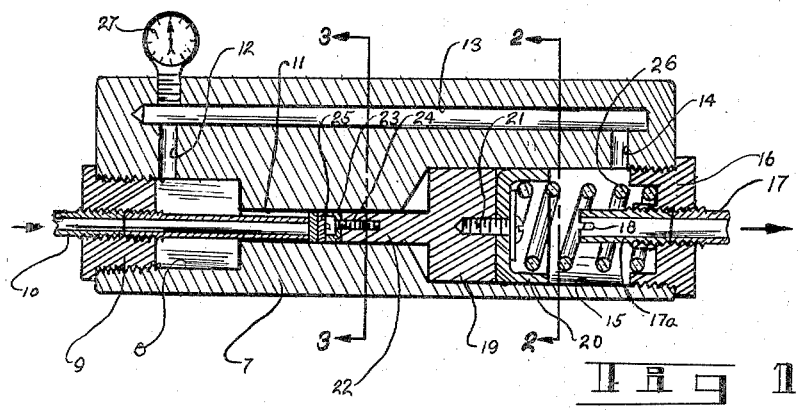
Fig. 1 is a longitudinal, central, vertical, sectional view of the invention.
Figure 2:
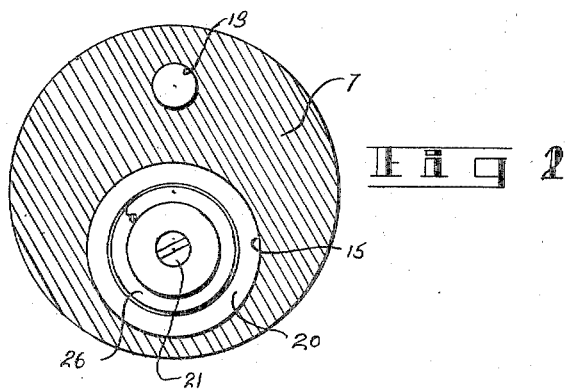
Fig. 2 is a sectional view taken on line 2—2 of Fig. 1.
Figure 3:
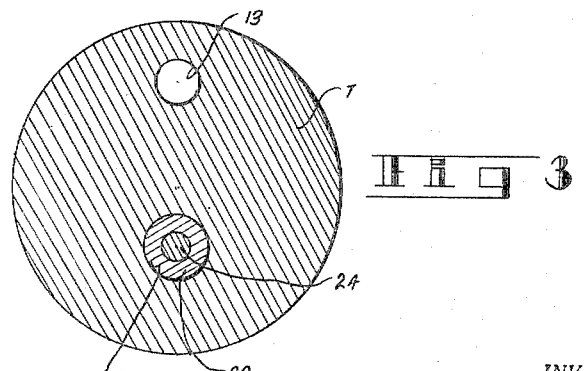
Fig. 3 is a sectional view taken on line 3—3 of Fig. 1.

As shown in the drawings, I provide a housing 7 having a recess 8 formed in one end which is closed by a threaded plug 9 having an inlet pipe 10 projected therethrough. This inlet pipe 10 is adapted to engage in the passageway or bore 11 formed in the housing 7. It will be noted that the pipe 10 is of an outside diameter less than the inside diameter of the bore 11 so that there is a clearance around the pipe 10. The pocket or recess 8 is adapted to communicate through the passages 12, 13, and 14 with a pocket or chamber 15 formed in the opposite end of the housing 7. This chamber 15 is closed by the threaded plug 16 in which is threaded the outlet pipe 17a in alignment with the outlet pipe 17. The inner end of the outlet pipe 17a is provided with the notches 18. Slidably mounted in the inner side of the chamber 15 is a piston 19 carrying the gasket 20 which is mounted thereon by the screw 21. Projecting from the inner face of the piston 19 is a stem 22 which slidably engages in the bore 11 and which carries at its inner end a gasket 23 which overlies the end face of the stem 22 and is secured thereto by the screw 24. Overlying the gasket are sealing disks 25.

Embracing the inner end of the pipe 17a and bearing at one end against the plug 16 is a coil spring 26, the opposite end of which bears against the piston 19 and serves normally to move it into the position shown in Fig. 1.

A pressure gauge 27 is mounted on the housing 7 so as to communicate with the passage 13.

In operation, the fluid, whether air or liquid, would be delivered through the inlet pipe 10. The pressure of this fluid would force the member 22 to move to the right of Fig. 1 so as to unseal the end of the pipe 10 and permit the fluid to escape through the bore 11 into the chamber or recess 8 from which it would pass through the passages 12, 13 and 14 into the chamber 15. The pressure necessary to move the piston 19 and the stem 22 to the right from the position shown in Fig. 1 can be varied by adjusting the tension on the spring 26. This is accomplished by threading the plug 16 inwardly or outwardly. When the fluid reaches the chamber 15, it will, of course, exert a pressure on the face of the piston 19 and gasket 20 and since this area is larger than the cross-sectional area of the stem 22, the piston 19 would be moved to the left of Fig. 1 so as to close the end of the pipe 10. In this action, the movement of the piston 19 would be effected by the fluid pressure and the pressure of the spring 26. It is obvious that the relation between the cross-sectional area of the piston 19 and the stem 22 would determine largely the action of the mechanism.

Frequently, it is desirable that the outlet from the fluid line be of considerably lower pressure than ordinarily maintained on the fluid line. For instance, assuming that the fluid pressure entering through the pipe 10 is at one hundred pounds per square inch, it may be desirable to have the fluid passing from the outlet line at a pressure of ten pounds per square inch. With the proper rear cross-sectional areas between the members 19 and 22 and the proper tension on the spring 26, this can be accomplished with the present device. The chamber 15 will be of sufficient size so that the fluid under pressure of one hundred pounds per square inch entering therein will immediately be reduced to ten pounds per square inch and this will effect a movement of the piston 19 to the left so as to close the end of the pipe 10 and prevent a greater pressure being built up in the chamber 15. As air begins to emit to the pipe 17, the pressure in the chamber 15 would begin to lower below the pressure of ten pounds per square inch which would again permit the incoming air under the higher pressure to move the piston to the right so as to open the end of the pipe 10 and permit more fluid under the higher pressure to pass over into the chamber 15. Consequently, with a device of this type, the fluid pressure may be reduced and the pressure emitted from the regulating or reducing valve be maintained substantially at a constant predetermined pressure. With pressure reducing valves commonly in use, it is necessary that the valves be adjusted to a much higher pressure than actually desired because when the consumption or use of the fluid at reduced pressure begins, a considerable lowering of the pressure is effected. This necessitates an initial use of the fluid at a higher pressure than that which is desired. With the present mechanism, however, the fluid remains at the desired reduced pressure even at the initial use of it.

What I claim as new is:

A pressure reducing valve of the class described, comprising: a housing having a high pressure chamber at one end and a low pressure chamber at the opposite end, there being a bore extending between said chambers and communicating therewith; an inlet pipe traversing said high pressure chamber and projecting into said bore and communicating with said high pressure chamber; means for closing the end of said high pressure chamber; a piston slidably mounted in said low pressure chamber and having a stem snugly engaging in said bore and movable into position for engaging and closing the end of said inlet pipe, said housing having passages establishing communication between said chambers; a spring for normally urging said piston into position for closing said inlet pipe; means for closing the outer end of said low pressure chamber and adjusting the tension of said spring; and an outlet pipe projecting through said last named closing means and having notches formed on its inner end.

SINAI LAFLEUR.

REFERENCES CITED

The following references are of record in the file of this patent:

UNITED STATES PATENTS

| Number | Name | Date |
|---|---|---|
| 319,896 | Fox | June 9, 1885 |
| 429,591 | Abbe | June 10, 1890 |
| 623,773 | Evans | Apr. 25, 1899 |
| 1,173,518 | Hoxsie | Feb. 29, 1916 |
| 1,837,001 | White | Dec. 15, 1931 |

FOREIGN PATENTS

| Number | Country | Date |
|---|---|---|
| 2,605 | Great Britain | July 25, 1874 |
| 806,053 | France | Sept. 14, 1936 |